United States Patent
Mulligan et al.

(10) Patent No.: US 7,508,326 B2
(45) Date of Patent: Mar. 24, 2009

(54) AUTOMATICALLY DISABLING INPUT/OUTPUT SIGNAL PROCESSING BASED ON THE REQUIRED MULTIMEDIA FORMAT

(75) Inventors: Daniel Mulligan, Austin, TX (US); David Baker, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 0 days.

(21) Appl. No.: 11/643,498

(22) Filed: Dec. 21, 2006

(65) Prior Publication Data
US 2008/0155134 A1    Jun. 26, 2008

(51) Int. Cl.
*H03M 7/00* (2006.01)
(52) U.S. Cl. .............. 341/50; 326/30; 710/20; 710/36
(58) Field of Classification Search ............... 341/50; 326/30, 82, 86; 710/20, 36
See application file for complete search history.

(56) References Cited

U.S. PATENT DOCUMENTS

| | | | |
|---|---|---|---|
| 4,703,198 A * | 10/1987 | Porter et al. | 326/86 |
| 6,256,686 B1 * | 7/2001 | Cornwell | 710/62 |
| 6,487,535 B1 * | 11/2002 | Smyth et al. | 704/500 |
| 7,039,116 B1 * | 5/2006 | Zhang et al. | 375/240.26 |
| 7,362,383 B2 * | 4/2008 | Reneau et al. | 348/706 |
| 2004/0081099 A1 * | 4/2004 | Patterson et al. | 370/241 |
| 2004/0122541 A1 * | 6/2004 | DiSanza et al. | 700/94 |
| 2005/0147386 A1 * | 7/2005 | Jung et al. | 386/95 |
| 2006/0208247 A1 * | 9/2006 | Barlow et al. | 257/1 |
| 2007/0153132 A1 * | 7/2007 | Jong | 348/705 |
| 2008/0056357 A1 * | 3/2008 | Chan et al. | 375/240.12 |

FOREIGN PATENT DOCUMENTS

KR   2003023375 A   *   3/2003

* cited by examiner

Primary Examiner—Khai M Nguyen

(57) ABSTRACT

A system and method operable to automatically disable input/output signal processing based on the required data format is provided. The need for an input/output module, such as an encoder, required to process input signal having a first data format (i.e. multimedia format) and produce an output signal having a second format (i.e. multimedia format) is determined. When the input/output module is not required to produce the output signal in the second format, the input/output module is disabled.

24 Claims, 13 Drawing Sheets

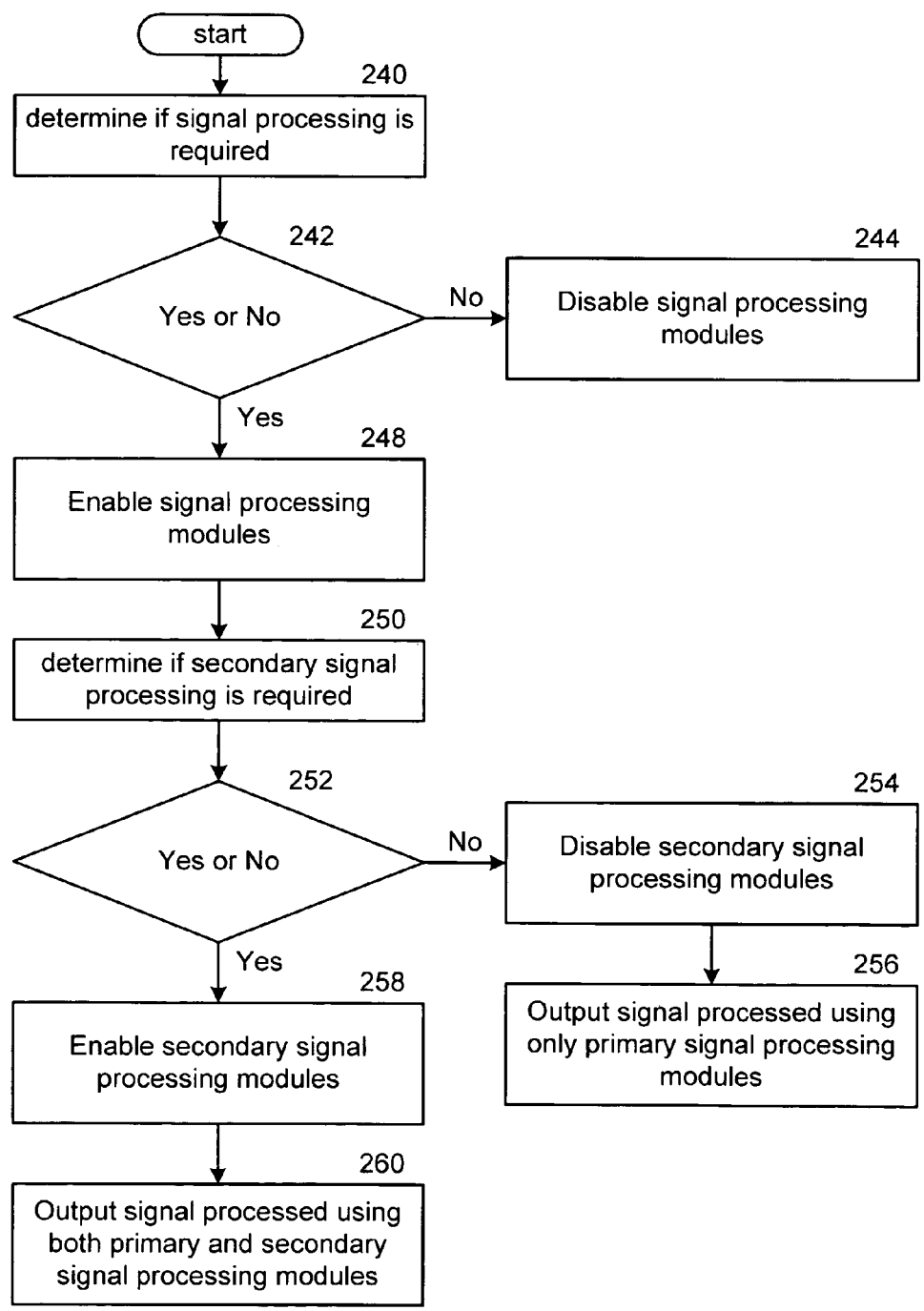

US 7,508,326 B2

AUTOMATICALLY DISABLING INPUT/OUTPUT SIGNAL PROCESSING BASED ON THE REQUIRED MULTIMEDIA FORMAT

TECHNICAL FIELD OF THE INVENTION

The present invention relates generally to signal processing, and more particularly, a system and method operable to disable input/output signal processing.

BACKGROUND OF THE INVENTION

As is known, a codec (coder/decoder) is used in almost all equipment that includes an audio or video component (e.g., CD players, Dictaphones, personal computers, laptops, DVD players, et cetera). In general, a codec is implemented as an integrated circuit (IC) and includes a digital interface, analog-to-digital converters, digital-to-analog converters, and analog mixing circuitry. The digital interface provides digitized signal to, and receives digitized signals from, a digital processing circuitry of the corresponding equipment. The digitized signals received via the digital interface are converted into analog signals via the digital-to-analog converters. The analog mixing circuitry may mix the converted analog signals with other analog signals or pass them unmixed to one of the outputs of the codec. Such outputs include a headphone or video driver output and a line-level output. Similarly, in an analog-to-digital converter, analog signals received are converted into digital signals wherein these signals are then digitally processed.

A codec may receive analog audio or video signals from external sources via a microphone input, line-in input, camera input, or tuner. The analog-to-digital converters convert the received analog signals into digitized signals, which are then provided to the digital interface. In addition to, or in the alternative, the received analog signals may be provided to the analog mixing circuitry for passing to an output of the codec and/or for mixing with other analog signals, where the mixed analog signals are provided to one of the audio codec outputs.

Typically, the equipment incorporating an audio or video codec includes ports or jacks operable to couple external output devices (e.g., headphones, line-out) to the analog outputs of the codec and for coupling external input devices (e.g., line-in, microphone) to the inputs of the codec. Additionally, when the output is not required, operating the codec results in decreased performance as processing capability and limited power resources are needlessly consumed.

Many manufacturers desire design flexibility when developing equipment that includes an audio or video component. Therefore, a need exists for a method and apparatus for programmable analog input/output pins of an IC.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 13 is a logic diagram of a method for enabling/disabling processing and/or modules in accordance with the present invention.

DETAILED DESCRIPTION OF THE INVENTION

Preferred embodiments of the present invention are illustrated in the FIGUREs, like numerals being used to refer to like and corresponding parts of the various drawings.

Embodiments of the present invention provide a system and method operable to automatically disable input/output signal processing based on the required data format. This addresses the prior tradeoff that existed between usability and performance (i.e. power consumption). Prior systems may have offered the ability to manually disable certain functions or processes. However, the required manual manipulations are often difficult to perform as they required a great deal of user specified inputs. The present invention automatically performs these functions without requiring user inputs. The need to process an input signal having a first data format (i.e. multimedia format) and produce an output signal having a second format (i.e. multimedia format) is determined. This processing may be performed by discrete processing input/output module(s), such as but not limited to an encoder or decoder. When the input/output module(s) are not required to produce an output in the second format, the module(s) are disabled. This improves system performance by, for example, increasing battery life.

Figure 1:
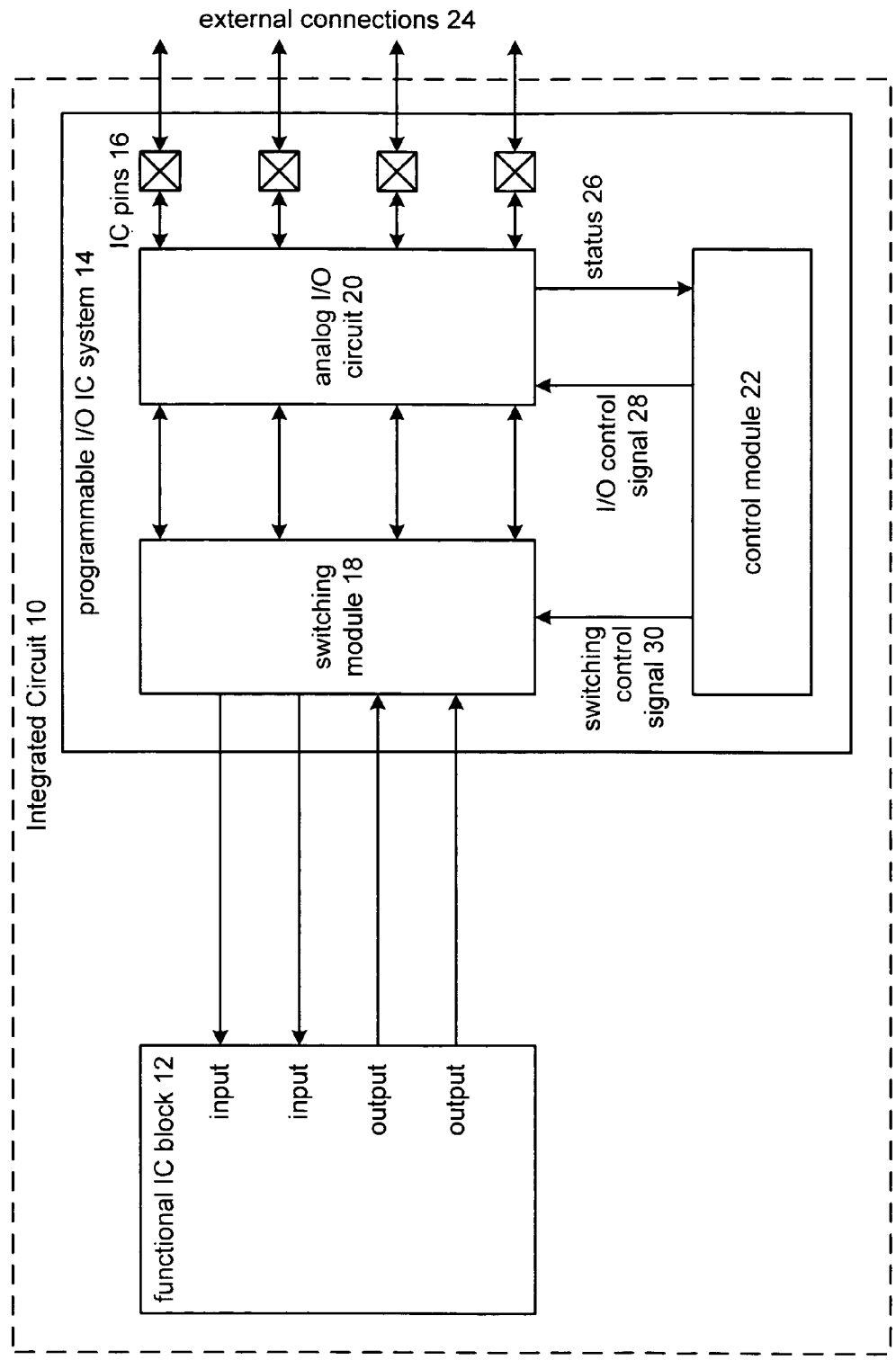
FIG. 1 is a schematic block diagram of an integrated circuit (IC) in accordance with the present invention.

FIG. 1 is a schematic block diagram of an integrated circuit (IC) 10 that includes a functional IC block 12 and a programmable input/output (I/O) IC system 14. The IC 10 may be of any construct that receives analog input signals and/or provides analog output signals. For example, the IC 10 may process audio signals, video signals, a combination thereof, et cetera. Accordingly, the functional IC block 12 may perform a wide variety of functions including processing digitized audio signals, processing digitized video signals et cetera. As shown, the functional IC block 12 includes a plurality of analog inputs and a plurality of analog outputs. As one of average skill in the art will appreciate, the functional IC block 12 may include more or less analog inputs and analog outputs than illustrated in FIG. 1.

The programmable I/O IC system 14 includes a plurality of IC pins 16, a switching module 18, an analog I/O circuit 20, and a control module 22. The plurality of IC pins 16 provides coupling to external connections 24. As shown, the IC pins 16 may function as analog input pins and/or analog output pins. The analog I/O circuit 20 is operably coupled to the IC pins 16 and senses the external connection 24 thereto and provides status information 26 (e.g., the impedance of a load coupled thereto, an identifying code, or other recognition means) to the control module 22. The analog I/O circuit 20 provides status information 26 for each of the IC pins 16.

The control module 22 interprets the status information 26 for each of the IC pins 16. Based on the status 26, the control module 22 generates an I/O control signal 28 for each of the IC pins 16. The analog I/O circuit 20 receives the I/O control signal 28 for each of the pins 16 and configures itself to function as an analog input or analog output. For example, one of the IC pins 16 may have a video display coupled thereto. The I/O circuit 20 senses the impedance of the device and provides the impedance as status 26 to the control module 22. The control module 22 interprets the impedance to determine that the device coupled to this particular pin is a video display. Based on this determination, the control module 22 generates an I/O control signal 26 such that the I/O circuit 20 configures itself as an output for this particular pin.

The control module 22 also generates a switching control signal 30 for each of the pins based on the status 26. The switching module 18 receives the switching control signal 30 and configures itself to provide the selected IC pin to a particular input or output of the functional IC block 12.

Figure 2:
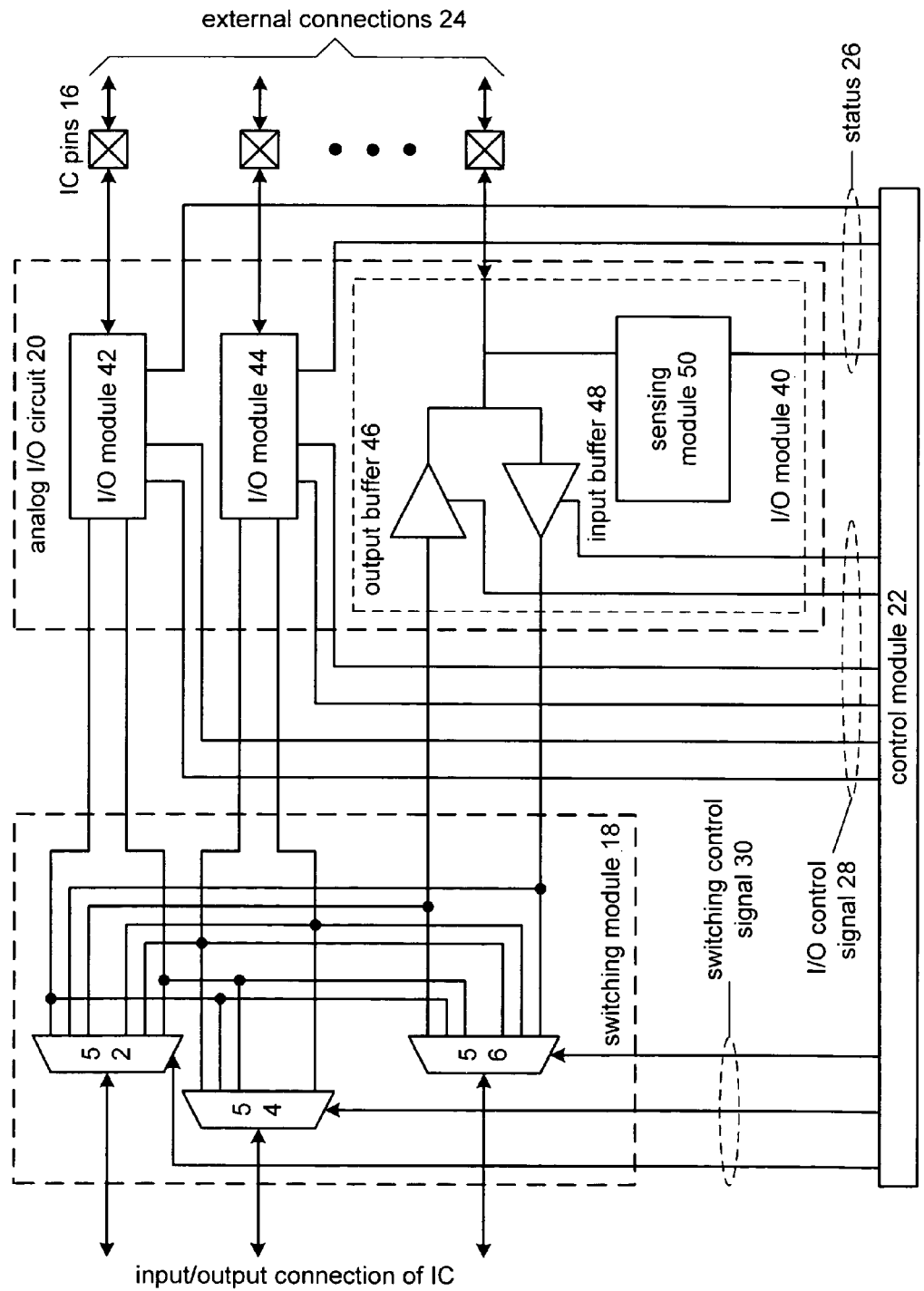
FIG. 2 is a schematic block diagram of a programmable input/output IC system in accordance with the present invention.

FIG. 2 is a schematic block diagram of one embodiment of the programmable I/O IC system 14. The system 14 includes the analog I/O circuit 20, the switching module 18, the plurality of IC pins 16 and the control module 22. The analog I/O circuit 20 includes a plurality of I/O modules 40-44. The switching module 18 includes a plurality of multiplexers 52-56. The number of I/O modules 40-42 corresponds to the number of IC pins 16. As one of average skill in the art will appreciate, the programmable I/O IC system 14 may include one or a plurality of IC pins depending on the desired functionality of the IC.

The I/O module 40-44 includes at least one tri-stated output buffer 46, at least one input buffer 48, which may be a tri-state device or may be effectively incorporated in an input node of the functional circuitry, and a sensing module 50. In operation, prior to configuration, the sensing module 50 senses the impedance on the corresponding IC pin. The impedance of the load on the IC pin is provided to the control module 22 as status information 26. The control module 22, based on a look-up table or other type of impedance determining algorithm, identifies the particular load on the particular pin. Based on the particular type of load (e.g., camera, monitor, display, line-out connection, line-in connection, et cetera) the control module 22 generates an I/O control signal 28 for the particular I/O module 40-44. The I/O control signal 28 places I/O module 40-44 in a desired configuration when the impedance of the input pin substantially matches a predetermined impedance level at the input node of the functional circuitry. For example, if a video input is coupled to the corresponding pin, the I/O control signal 28 places the output buffer 46 in a high impedance state and the input buffers 48 are activated. As an alternative example, if the load coupled to the pin is a video display, the control module 22 generates the I/O control signal 28 to place the input buffer 48 in a high impedance state and the output buffer 46 in the active state. These examples may be implemented based on user input or automated at a system level.

Additionally, control signal 28 may be used to determine the need for I/O signal processing in order to produce a signal having a particular format. When the I/O module is not required to produce the particular format, I/O module 40-44 may be disabled. I/O module 40-44 may receive input in the form of a digital video format, component video format, analog video format, composite video format, digital audio format, or analog audio format and may produce any available audio or video format output from these inputs. This ensures that when a video signal having a different format is not required, I/O module 40-44 may be at least partially disabled in order to conserve both processing and internal power resources within the I/O IC system 14. Conserving power allows improved battery life of a portable playback or recording device. Additionally, other embodiments of these I/O modules may include a video or audio amplifier which may be used to amplify the output of the I/O module 40-44.

Thus, usability and performance of the system is enhanced by automatically enabling/disabling certain functions or processes without user inputs. The need to process a signal having a first data format (i.e. multimedia format) and produce an output signal having a second format (i.e. multimedia format) is determined based on the presence of an active external device coupled to IC pins 16. This decision may be based on sensed impedance, voltage, current or signal. When the I/O module(s) associated with certain functions or processes are not required, the module(s) are disabled, automatically reducing power consumption and increasing battery life.

In one specific example, a characteristic impedance may be detected at the output pins of the IC. With a video device, a 75 ohm impedance may correspond to having no video devices coupling to an output port (i.e. IC pins 16). This characteristic impedance may change to a 37.5 ohm impedance when a video device couples to IC pins 16. When this 37.5 ohm impedance is not present, it is desirable to disable I/O module 40-44 and not produce the video output signal which may also include amplification in order to, save both processing resources and internal power resources.

The control module 22 also generates the switching control signals 30, which cause the switching module 18 to provide a connective input or output path between at least one of the pins and the functional IC block 12. In this illustration, the switching module 18 includes three bi-directional multiplexers 52-56. As one of average skill in the art will appreciate, the switching module 18 may include more or less multiplexers depending on the desired cross connection of the IC pins to the functional IC block or may use switches, transistors, etc. in place of or combination with the multiplexers.

In this illustration, each multiplexer 52-56 is coupled to the output buffer and/or the input buffer of each I/O module 40-44. (Note that each multiplexer 52-56 may include at least one input multiplexer and at least one output multiplexer, or each multiplexer 52-56 may be a bidirectional multiplexer.) Accordingly, based on the switching control signal 30, each multiplexer may pass an analog or digital I/O signal to any one of the IC pins. Accordingly, significant flexibility is provided to manufacturers of ICs that include a programmable I/O IC system 14. In addition, by sensing the load placed on the IC pin 16 as part of configuring the analog I/O circuit, a misconnection by a user of equipment may be automatically corrected by the programmable I/O IC system 14, thus avoiding costly service calls or improving ease of use.

Figure 3:
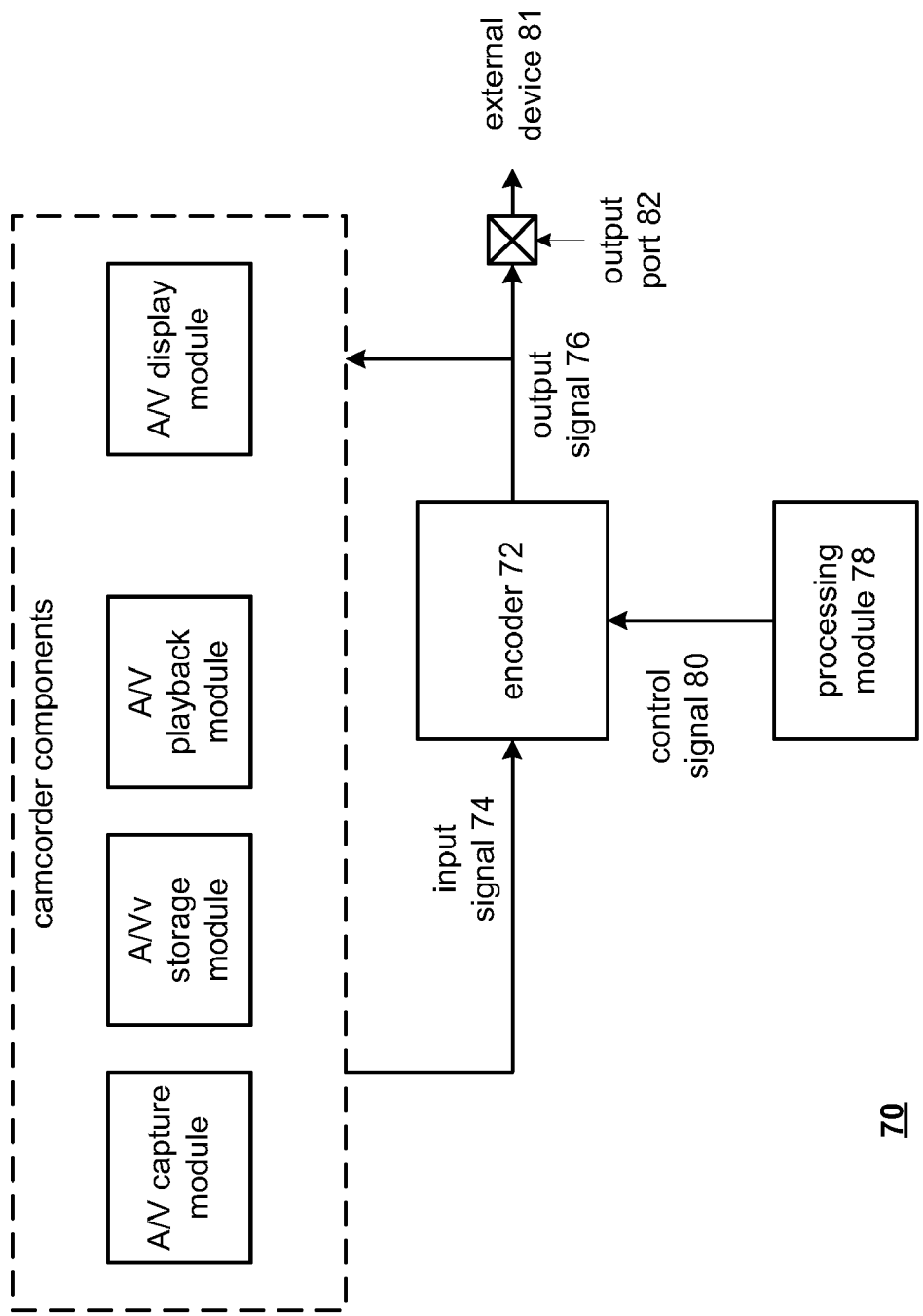
FIG. 3 is a schematic block diagram of an embodiment of a video system in accordance with the present invention.

FIG. 3 is a schematic block diagram of one embodiment of the present invention that provides a system that may automatically disable input or output signal processing (or processing modules) based on required media formats. System 70 includes an encoder (I/O module) 72 and processing module 78. Encoder 72 may receive an input signal 74 having a first format and produce any output signal 75 having a second format. The input signal 74 may be provided from conventional camcorder components (e.g., an audio/video capture module, an audio/video storage module, and/or an audio/video playback module) and the output signal 76 may be provided to a conventional display module of a camcorder. These formats may include, but are not limited to digital-video formats, component-video formations, analog-video formats, composite-video formats, digital-audio formats, analog-audio formats, or another analog and digital signal format know to those having skill in the art. Processing module 78 operably coupled to encoder 72. Processing module 78 may determine whether or not an output signal is required to be produced by encoder 72. Should the output signal not be required, processing module 78 may disable encoder 72. Processing module 78 provides a control signal 80 that disables encoder 72 when the output signal 76 is not required. By disabling encoder 72 processing resources and internal power reserves are conserved. When the encoder is enabled, the output signal 76 may be provided to an external device 81 via output port 82.

Figure 4A:
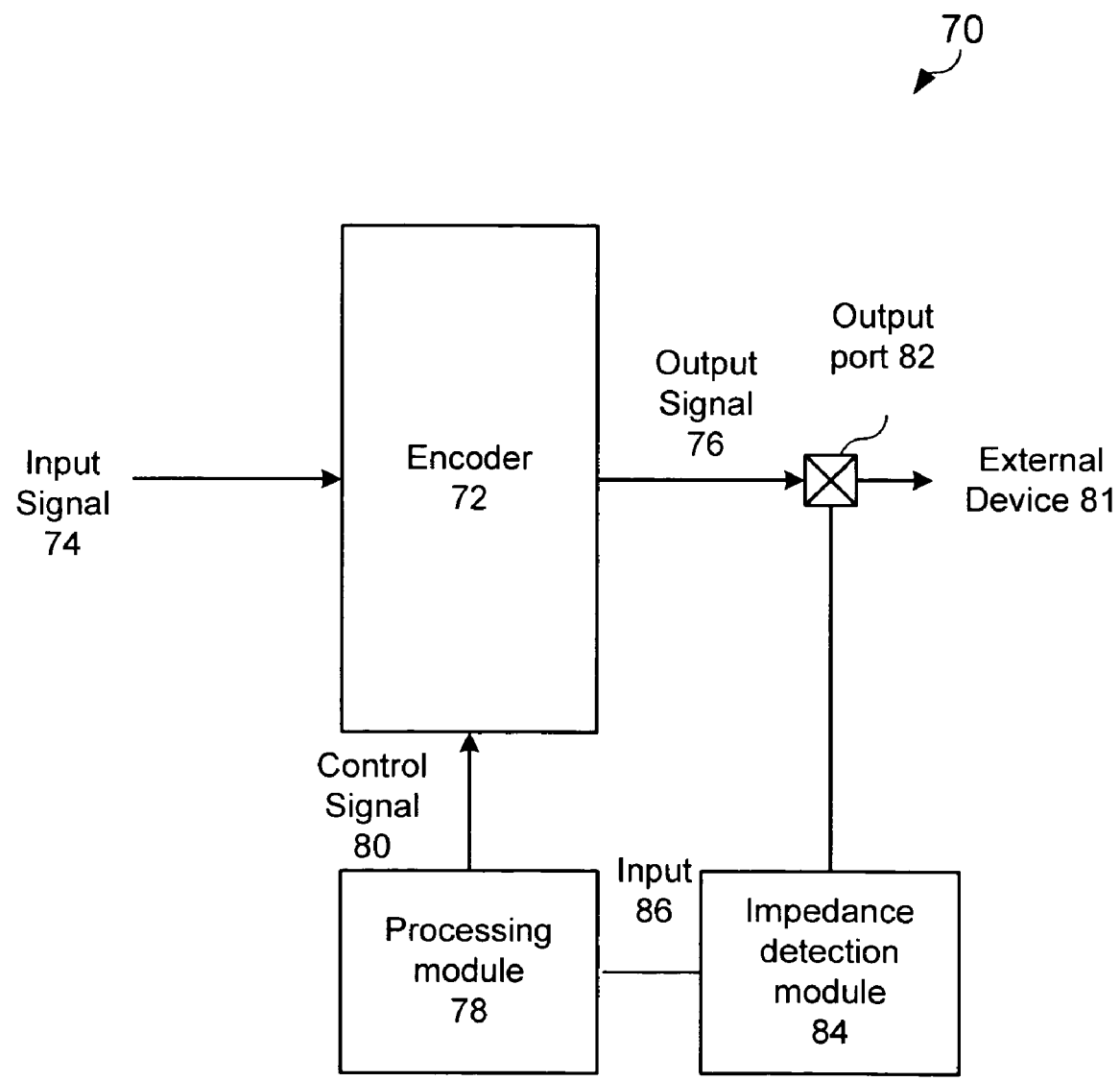
FIG. 4A is a schematic block diagram of another embodiment of a video system in accordance with the present invention.

Another embodiment as depicted in FIG. 4A couples an impedance detection module 84 to output port 82. Impedance detection module 84 may also couple to processing module 78. The impedance detection module detects the impedance at output port 82 for comparison with stored values. For example, when a 37.5-ohm impedance is associated with output port 82, this may indicate the presence of an external video device 81 coupled to the port. In other embodiments the presence of the external device may be determined by a detected voltage, current or signal. Should the external device not be present there is no need for encoder 72 to generate the output signal from the input signal. Therefore, the impedance detection module 84 will provide an input 86 to processing module 78. Processing module 78 may then issue a control signal 80 to encoder 72 that disables encoder 72 when an external device 81 is not coupled to output port 82.

Figure 4B:
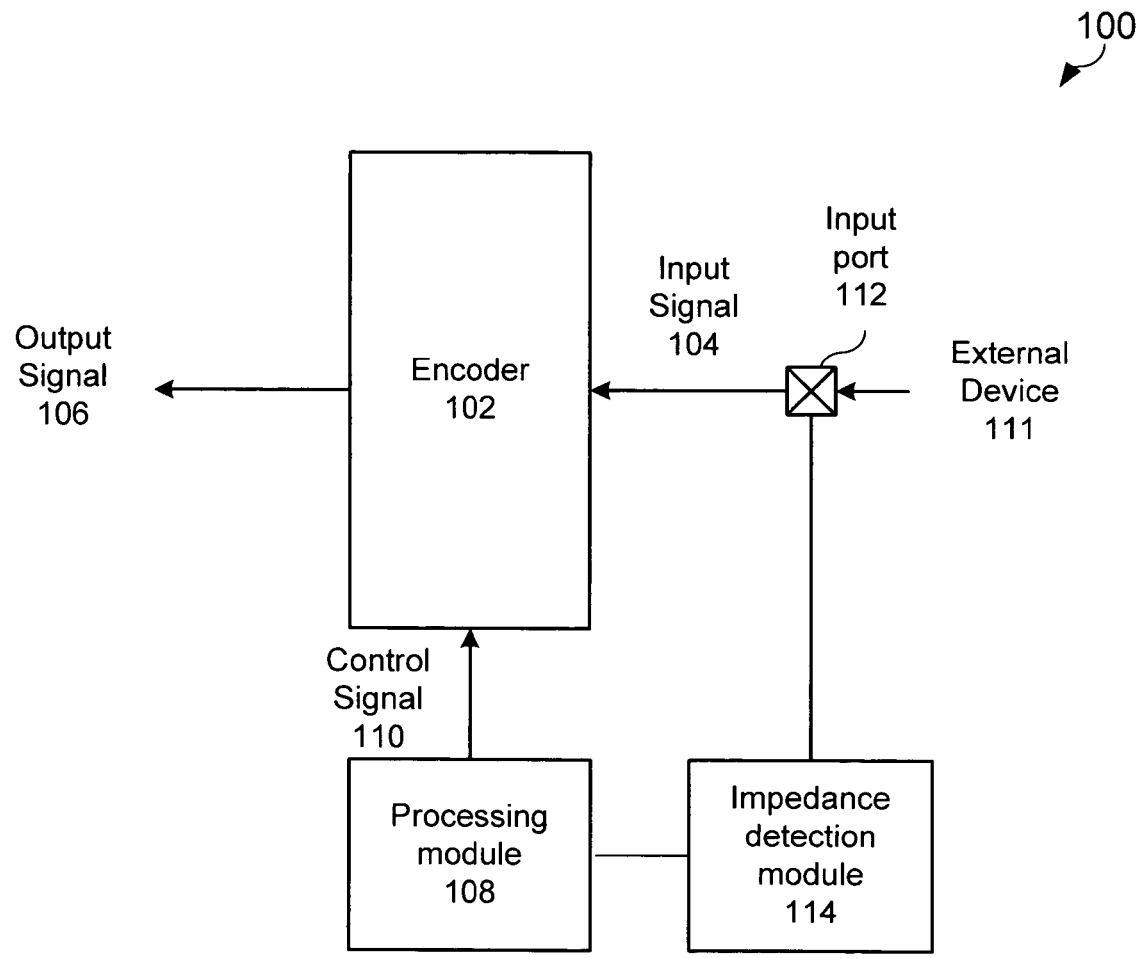
FIG. 4B is a schematic block diagram of another embodiment of a video system in accordance with the present invention.

FIG. 4B depicts a similar embodiment; however, in this case, system 100 has an encoder 102 and processing module 108 that may disable encoder 102 when no input signal is required to be processed. In the embodiment picture in FIG. 4B, encoder 102 is disabled when no input signal 104 is provided. This in turn, may also conserve processing resources and power resources within a handheld recording or audio/video playback device. Again, in this embodiment impedance detection module 114 coupled to the input port that received input signal 104 may determine the presence of the input signal as evidenced by a 37.5 ohm resistance in the case of a traditional analog video signal.

Figure 5:
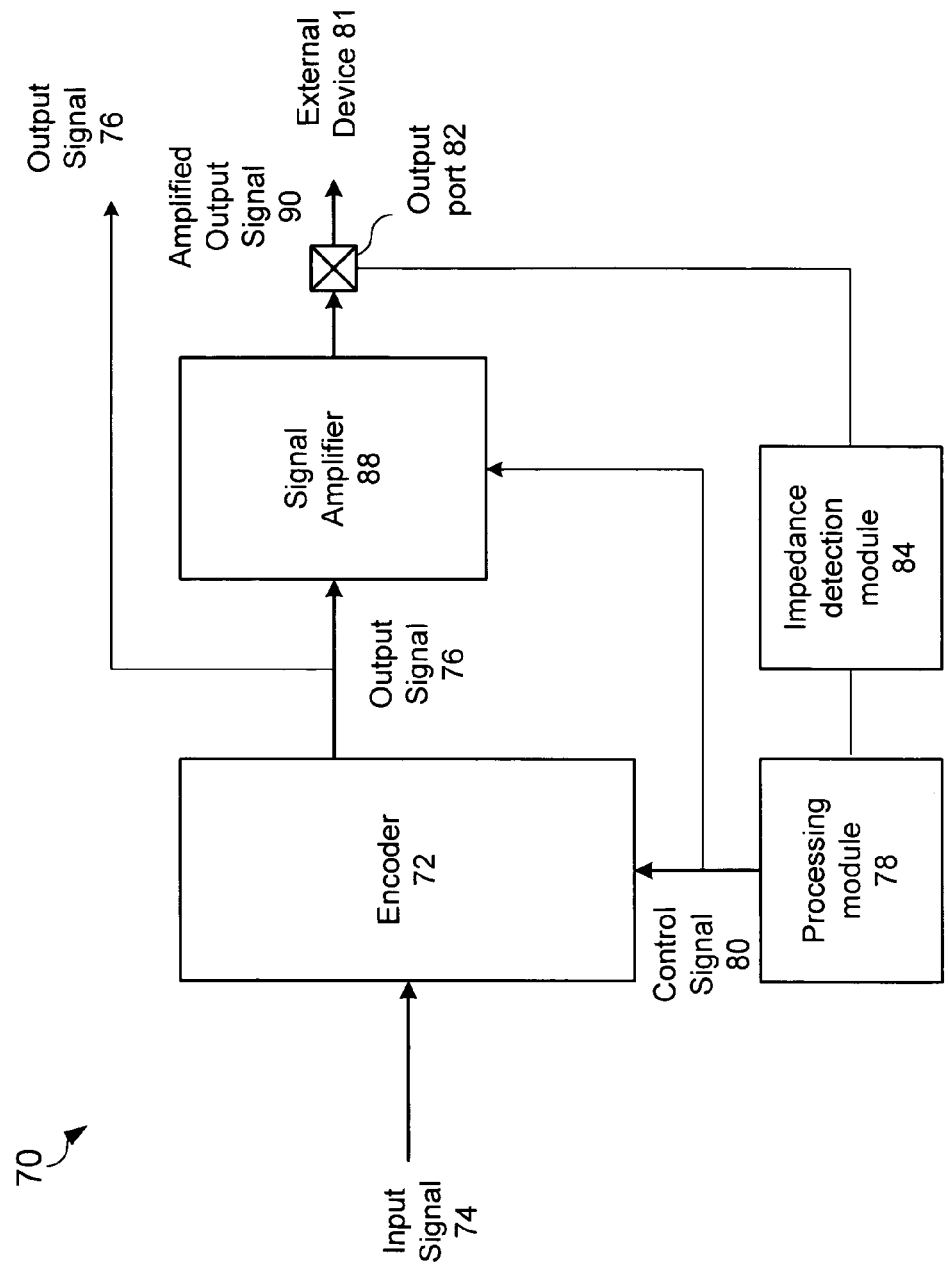
FIG. 5 is a schematic block diagram of another embodiment of a video system in accordance with the present invention.

In the embodiment depicted in FIG. 5, a signal amplifier 88 receives output signal 76. Signal amplifier 88 then provides the amplified output signal 90 to external device 81. Processing module 78 may not only issue a control signal to encoder 72 (which is used to perform primary signal processing), but in this case, may also issue a control signal 80 to signal amplifier 88 in order to disable either or both the encoder 72 and signal amplifier 88 (which is used to perform secondary signal processing) when the amplified output signal is not required. In some instances, the unamplified output signal may be required but the amplified output signal may not be required. For example, in the case of a recording or playback device, output signal 76 may be required to display the recorded image within the recording or playback device. However, when an external device is not coupled to the recording or playback device the amplified signal may not be required. Thus, processing module 78 may determine that there is no need for the amplified signal and only disable the signal amplifier 88.

Figure 6:
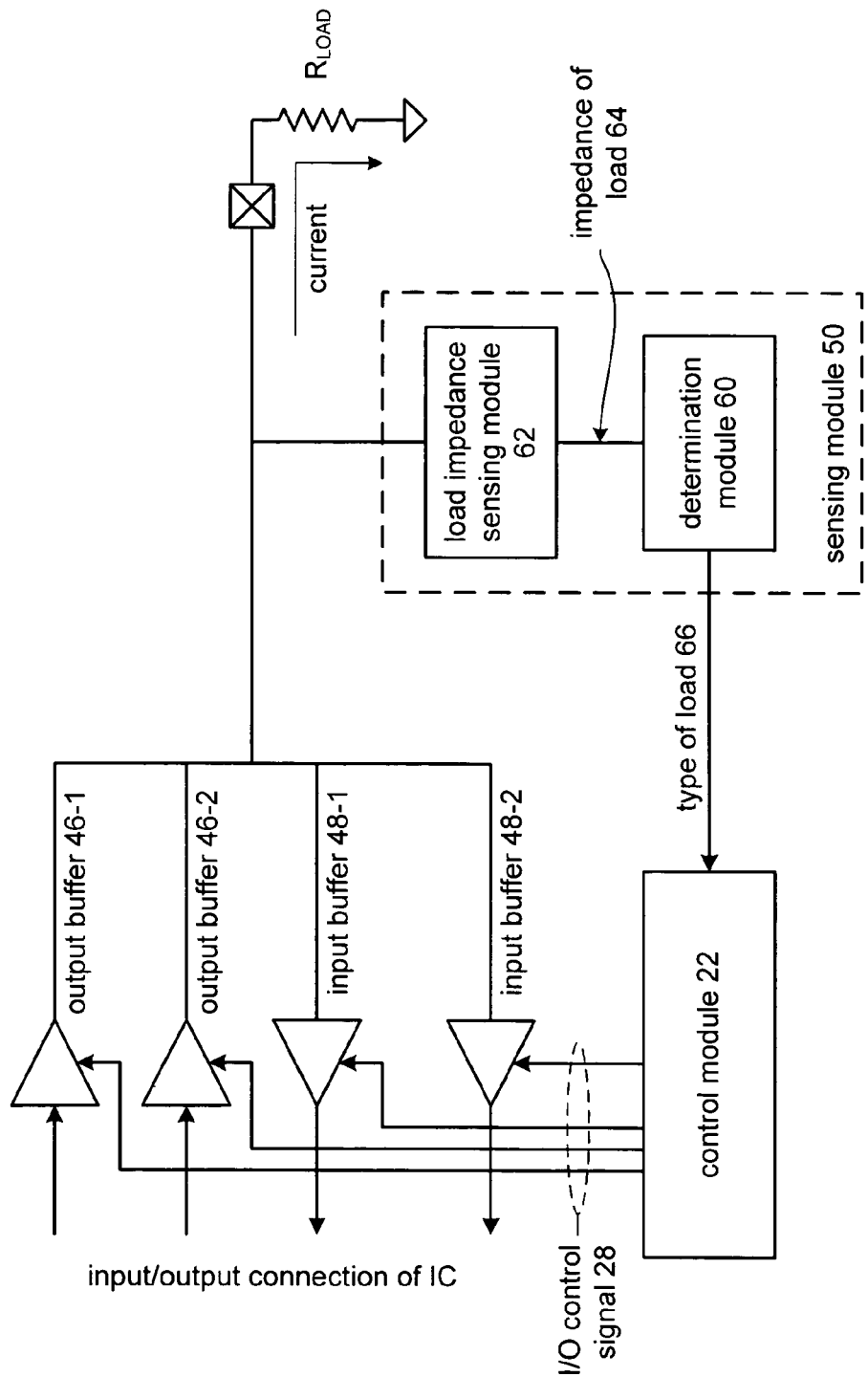
FIG. 6 is a schematic block diagram of an input/output module in accordance with the present invention.

FIG. 6 is a schematic block diagram of one embodiment of an I/O module 40-44. In this illustration, the I/O module 40 includes the sensing module 50, and a plurality of input buffers 48-1 and 48-2 and a plurality of output buffers 46-1 and 46-2. The I/O module 40 is coupled to the control module 22, which is shown for convenience. The sensing module 50 may utilize impedance detection to determine the presence of an external device. Sensing module 50 includes a load impedance sensing module 62 and a determination module 60. Note that the determination module 60 may be part of control module 22 and/or may be part of the processing device within the IC.

In operation, the load impedance sensing module 62 senses the voltage and current associated with the load ($R_{load}$) coupled to the corresponding IC pin. The load may be a microphone, television, video output, video input, coaxial cable, headphone, speakers, line input jack, line output jack, et cetera. With the current flowing through the load, the load impedance sensing module 62 determines the impedance of the load 64.

Determination module 60 receives the impedance of load 64 and determines the particular type of load 66. Note that depending on configuration of the determination module 60, the impedance of the load 64 or the type of load 66 may correspond to the status information 26 of the preceding FIGS. The functionality of the determination module 60 and load impedance sensing module 62 will be described in greater detail with reference to FIG. 7. The control module 22, based on the type of load 66, generates the I/O control signals 28 as previously described.

Figure 7:
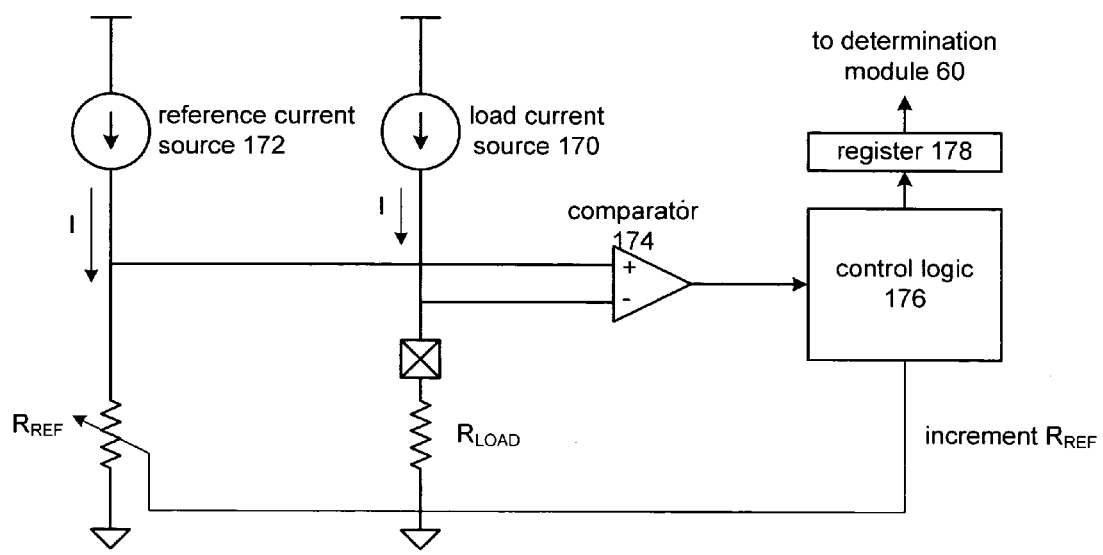
FIG. 7 is a schematic block diagram of a load impedance module in accordance with the present invention.

FIG. 7 is a schematic block diagram of one embodiment of the load impedance sensing module 62 or impedance detection module 84. The load impedance sensing module 62 includes a load current source 170, a reference current source 172, a variable reference impedance ($R_{ref}$), a comparator 174, control logic 176, and a register 178. The load current source 170 and reference current source 172 may provide a matched current to the load and variable reference impedance, respectively, or the reference current source 172 may be proportional to the load current 170. If the reference current source 172 is proportional to the load current 170, the variable impedance ($R_{ref}$) is increased proportionally with respect to the load of the pin.

In operation, the load current source 170 provides a current to the load on the pin ($R_{load}$). As such, a voltage is imposed across the load. The reference current source 72 also provides a current to the variable impedance ($R_{ref}$), which is initially set to its lowest value. Accordingly, a voltage is imposed across the reference impedance. The comparator 174 compares the voltage imposed across the load and across the reference impedance. If the voltage across the reference impedance is less than the voltage across the load, the control logic 176 increments the variable impedance and the comparison is done again. The control logic 176 continues to increment the reference impedance until the voltage imposed across the reference impedance exceeds the voltage imposed across the load.

When the voltage across the reference impedance exceeds the voltage across the load, the control logic 76 generates a corresponding digital value indicating the impedance. The digital load impedance is stored in register 78, or some other memory device, and subsequently provided to the determination module 60.

Figure 8:
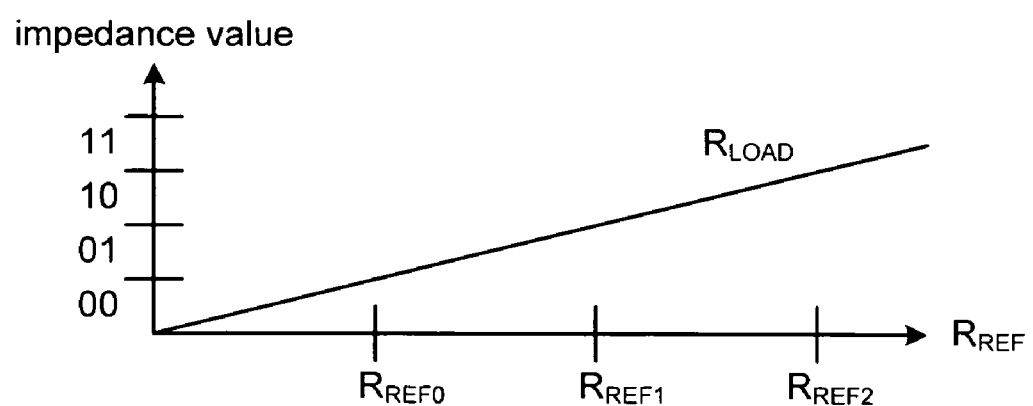
FIG. 8 is a graph depicting the control logic functionality of the control logic of a load impedance module.

FIG. 8 is a graph illustrating the general functionality of the control logic 176. The initial variable impedance setting is depicted as $R_{ref0}$. If, when the variable impedance is set at $R_{ref0}$ and the load impedance is less than $R_{ref0}$, the control logic 176 generates an impedance value having a digital value of 00. If, the load impedance falls between the initial variable impedance setting ($R_{ref0}$) and the $2^{nd}$ setting of the variable impedance ($R_{ref1}$), the control logic 176 generates a digital impedance value of 01. If the load impedance falls between the $2^{nd}$ and $3^{rd}$ reference impedances ($R_{ref1}$ and $R_{ref2}$), the control logic 76 generates a digital value of 10. If the impedance of the load is greater than the $3^{rd}$ impedance reference value ($R_{ref2}$), the control logic 76 generates a digital value of 11.

The determination module 60, which may use a look-up table, interprets the digital impedance value to identify the particular type of device. For example, a microphone may have an impedance value in the range of 1-2 kilo-OHMS, headphones may have an impedance value between 8 OHMS and 60 OHMS, speakers may have an impedance value between 4 and 16 OHMS, video signals may have an impedance of about 37.5 OHMS. As one of average skill in the art will appreciate, the steps of the variable impedance may be more than the four illustrated in FIG. 8 to provide greater granularity in determining the impedance of the load.

Figure 9:
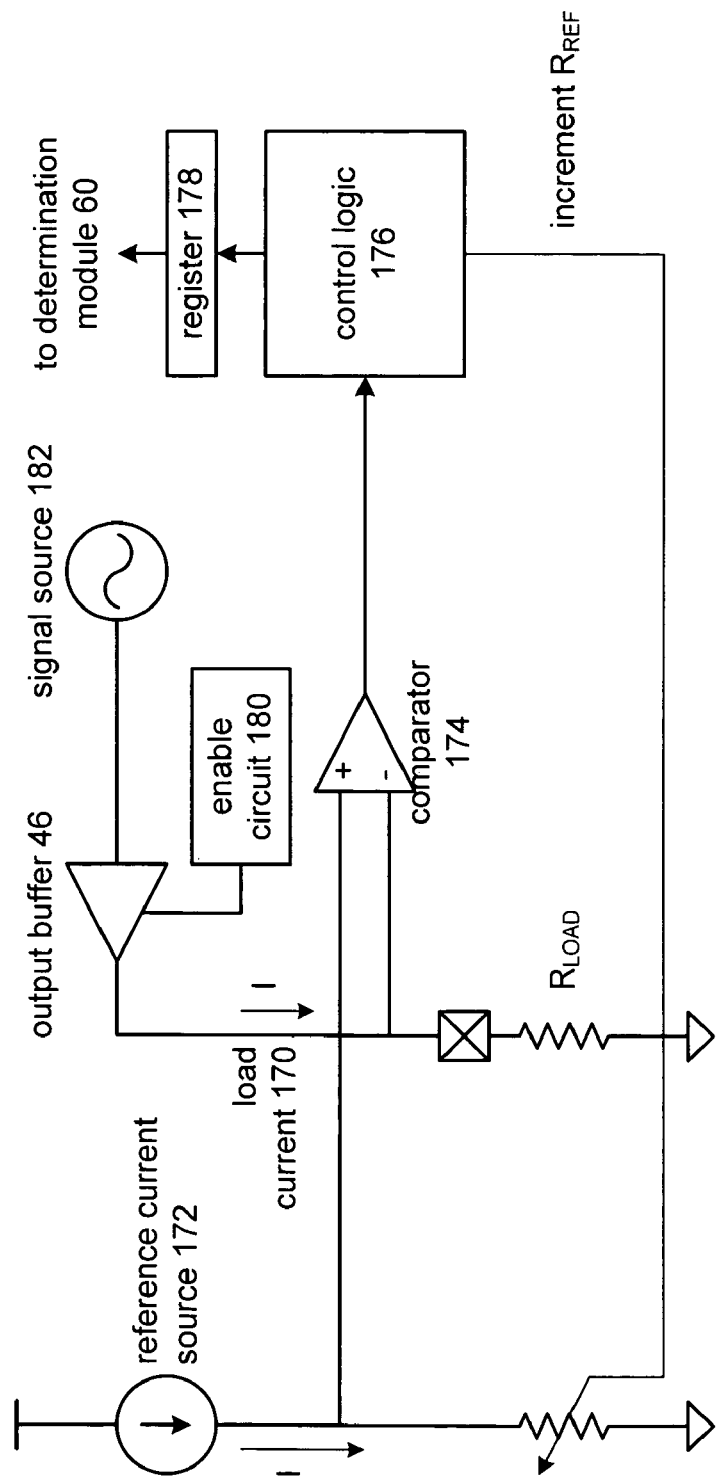
FIG. 9 is a schematic block diagram of an alternate load impedance module in accordance with the present invention.

FIG. 9 is a schematic block diagram of an alternate embodiment of an impedance of detection module. In this embodiment, the impedance detection module includes the reference current source 172, comparator 174, control logic 176, register 718, an enable circuit 180 and a signal source 182. The enable circuit 180 is operably coupled to enable an output buffer 46 of the I/O module to provide the load current 170 based on the signal source 182. The load current 170 may be in proportion to the reference current produced by the reference current source 172, which may be a matched buffer to that of the output buffer 46. When the reference current source 172 is implemented as a matched buffer, it receives the signal produced by the signal source 182 to generate the reference current. The signal source 182 may be a DC signal source, or a variable signal source. For a variable signal source, the frequency may be varied to further fine-tune the impedance of the load. Accordingly, the impedance of the load may be frequency dependent. Based on this frequency dependency, a more accurate interpretation of the particular device coupled to the pin may be rendered.

With the output buffer generating the load current source 70, the load impedance sensing module 62 functions similarly to the load impedance module of FIG. 4. Note that multiple output buffers, with different drive strengths may be used to supply the load current 70. As the output buffer 46 is changed, the variable impedance scale is accordingly changed. For example, the variable impedance scale is lower if the output driver 46 is capable of driving speakers or headphones. Conversely, if the output buffer 46 is designed to source a line-out, which is significantly less output power than headphones or speakers, the variable impedance scale would be adjusted accordingly.

Figure 10:
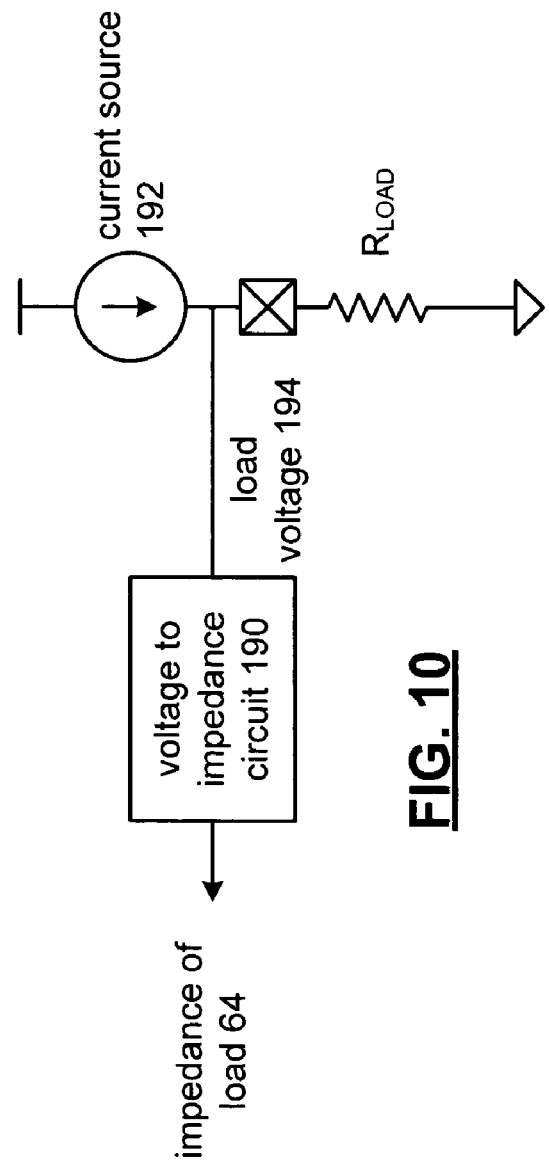
FIG. 10 is a schematic block diagram of another embodiment of a load impedance module in accordance with the present invention.

FIG. 10 is a schematic block diagram of another embodiment of an impedance detection module. This embodiment includes a current source 192 and a voltage-to-impedance circuit 190. The current source 192 generates the current that imposes a load voltage 194 across the load coupled to the pin. The voltage-to-impedance circuit 190 interprets the load voltage in view of the current provided by current source 192 to identify the impedance of the load or external device.

Figure 11:
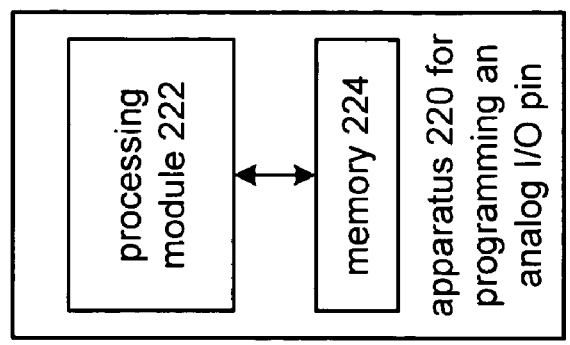
FIG. 11 is a schematic block diagram of an apparatus for programming an analog input/output pin in accordance with the present invention.

FIG. 11 is a schematic block diagram of an apparatus 220 for programming an I/O or signal processing module an IC. The apparatus 220 includes a processing module 222, and memory 224. The processing module 222, like processing modules 78 and 108 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 224 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 222 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 224 stores, and the processing module 222 executes, operational instructions corresponding to at least some of the steps and/or functions illustrated in FIGS. 12 and 13.

Figure 12:
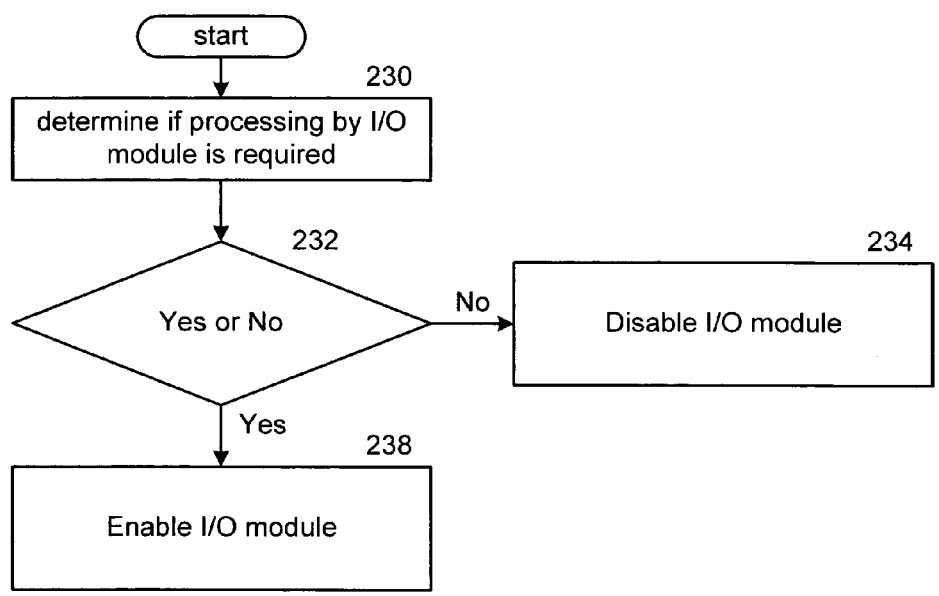
FIG. 12 is a logic diagram of a method for enabling/disabling processing and/or modules in accordance with the present invention.

FIG. 12 provides a logic flow diagram in accordance with an embodiment in the present invention that describes a method to automatically enable/disable signal processing or signal processing modules based on signal format requirements. This addresses the prior tradeoff that existed between usability and performance. The need to process an input signal having a first data format (i.e. multimedia format) and produce an output signal having a second format (i.e. multimedia format) is determined. This may involve the detection of the presence of an external device coupled to the circuit. Discrete processing input/output module(s), such as but not limited to an encoder or decoder are typically used to transform the input signal from one format to another format. When the input/output module(s) are not required to produce an output in the second format (i.e. no external device is present or active), the module(s) are disabled. This improves system performance by, for example, increasing battery life. This process begins in step 230 where the question is asked whether or not a signal processing or the signal processing module is required. This involves the detection of an external device and the determination as to whether or not the device is active. Detection of the device may involve detection of a control signal, voltage, impedance, or current. Detection may involve temporarily disabling the modules to test for the presence of an external device and its status (i.e. active or inactive). At decision point 232, a determination is made as to whether or not the signal processing or processing module is required. In step 234, should the processing module not be required, the processing or signal processing module is disabled. However, step 238 indicates that when the signal processing or signal processing module is required, the processes will be enabled.

FIG. 13 provides a logic flow diagram in accordance with an embodiment in the present invention that describes in further detail methods used by the present invention to automatically disable signal processing based on signal format requirements. This process begins in step 240 where the question is asked whether or not primary signal processing is required. This may involve the transformation of an analog or digital signal from one format to another format. At decision point 242, a determination is made as to whether or not the signal processing is required. Should the signal processing not be required, as is indicated in the branch containing step 244, the signal processing modules will be disabled. However, should the signal processing modules be required, step 248 will enable the signal processing modules. Then in step 250, a determination may be made to determine whether or not secondary signal processing is required. This may involve the amplification of the output signal. For example, to drive a monitor or television, a video signal may be amplified for display on an external device. At decision point 252, a determination is made as to whether or not the secondary signal processing is required. When the secondary signal processing is not required, the secondary signal processing modules will be disabled in step 254. However, the system will output a signal process only using the primary signal processing described above. Should the secondary signal processing be required as indicated in step 258, this processing would be enabled and would allow in step 260, the output of a signal process using both primary and secondary signal processing.

In summary, the present invention provides a system and method operable to automatically disable input/output signal processing based on the required data format. The need for an input/output module, such as an encoder, required to process input signal having a first data format (i.e. multimedia format) and produce an output signal having a second format (i.e. multimedia format) is determined. When the input/output module is not required to produce the output signal in the second format, the input/output module is disabled.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, IC process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A system comprising:
    an encoder operable to receive an input signal having a first data format and produce an output signal having a second format;
    an output port operably coupled to the encoder, wherein the output port is operable to pass the output signal to an external device;
    an output impedance detection module operably coupled to the output port, the output impedance detection module operable to detect an impedance of the external device coupled to the output port; and
    a processing module operably coupled to the encoder and the impedance detection module, wherein the processing module is operable to:
        determine whether an output signal is required in the second format based on a relationship between the impedance of the external device and an impedance threshold; and
        disable the encoder when the output signal is not required in the second format.

2. The system of claim 1, wherein the external device comprises a device operable to receive a video input.

3. The system of claim 1, further comprising an amplifier operable to receive and amplify the output signal of the encoder and pass the amplified output signal to the output port, wherein the processing module is operable to disable the amplifier when the output signal is not required in the second format.

4. The system of claim 1, wherein the encoder comprises a video encoder.

5. The system of claim 1, wherein the first format and second format each comprises a respective format selected from the group consisting of:
    a digital video format;
    a component video format;
    an analog video format;
    a composite video format;
    a digital audio format; and
    an analog audio format.

6. The system of claim 1, wherein the impedance detection module comprises:
    a variable reference impedance representative of the impedance threshold;
    a first current source operable to drive a first current at the variable reference impedance;
    a second current source operable to drive a second current at the output port; and
    a comparator comprising a first input to receive a first voltage at the variable reference impedance, a second input to receive a second voltage at the output port, and an output to provide a signal representative of the relationship between the impedance of the external device and the impedance threshold.

7. The system of claim 6, further comprising:
    control logic operable to:
        adjust the variable reference impedance until the first voltage is greater than second voltage; and
        store a value representative of the variable reference impedance at the point that the first voltage exceeds the second voltage.

8. The system of claim 7, wherein the processing module is operable to determine whether the output signal is required in the second format based on the value representative of the variable reference impedance.

9. The system of claim 7, wherein the second current source comprises an output buffer driven by a variable signal.

10. The system of claim 1, wherein the impedance detection module comprises:
- a current source operable to drive a current at the output port; and
- a voltage-to-impedance circuit configured to determine the impedance of the external device based on the current and a load voltage at the output port.

11. An audio/video (AV) recording and playback device, comprising:
- an AV capture module operable to capture AV signals;
- an AV storage module operably coupled to the AV capture module, wherein the AV storage module is operable to store captured AV signals;
- a playback module operably coupled to the AV storage module, wherein the playback module is operable to retrieve captured AV signals and produce a playback signal having a first data format;
- an encoder operable to receive the playback signal and produce an output signal having a second format;
- an output port operably coupled to the encoder, wherein the output port is operable to pass the output signal to an external device;
- an amplifier operable to receive and amplify the output signal of the encoder and pass the amplified output signal to the output port; and
- a processing module operably coupled to the encoder and the amplifier, wherein the processing module is operable to:
  - determine whether an output signal is required in the second format; and
  - disable the encoder and the amplifier when the output signal is not required in the second format.

12. The AV recording and playback device of claim 11, wherein the external device comprises a display module operable to process and display the amplified output signal.

13. The AV recording and playback device of claim 11, further comprising an output impedance detection module operably coupled to the output port and the processing module, wherein:
- the impedance detection module is operable to detect an impedance of the external device coupled to the output port; and
- the processing module is operable to determine whether the output signal is required in the second format, based on a relationship between the impedance of the external device and an impedance threshold.

14. The system of claim 13, wherein the first format and second format each comprises a respective format selected from the group consisting of:
- a digital video format;
- a component video format;
- an analog video format; and
- a composite video format.

15. The AV recording and playback device of claim 13, wherein the impedance detection module comprises:
- a variable reference impedance representative of the impedance threshold;
- a first current source operable to drive a first current at the variable reference impedance;
- a second current source operable to drive a second current at the output port; and
- a comparator comprising a first input to receive a first voltage at the variable reference impedance, a second input to receive a second voltage at the output port, and an output to provide a signal representative of the relationship between the impedance of the external device and the impedance threshold.

16. The AV recording and playback device of claim 15, further comprising:
- control logic operable to:
  - adjust the variable reference impedance until the first voltage is greater than the second voltage; and
  - store a value representative of the variable reference impedance at the point that the first voltage exceeds the second voltage.

17. The AV recording and playback device of claim 16, wherein the processing module is operable to determine whether the output signal is required in the second format based on the value representative of the variable reference impedance.

18. The AV recording and playback device of claim 16, wherein the second current source comprises an output buffer driven by a variable signal.

19. The AV recording and playback device of claim 13, wherein the impedance detection module comprises:
- a current source operable to drive a current at the output port; and
- a voltage-to-impedance circuit configured to determine the impedance of the external device based on the current and a load voltage at the output port.

20. In a system comprising an encoder operable to receive an input signal having a first data format and produce an output signal having a second format and an output port operable to pass the output signal to an external device, a method comprising:
- detecting an impedance of the external device coupled to the output port;
- determine whether an output signal is required in the second format based on a relationship between the impedance of the external device and an impedance threshold; and
- disable the encoder when the output signal is not required in the second format.

21. The method of claim 20, wherein the external device comprises a device operable to receive a video input.

22. The method of claim 20, wherein the system further comprises an amplifier operable to receive and amplify the output signal of the encoder and pass the amplified output signal to the output port, and the method further comprising:
- disabling the amplifier when the output signal is not required in the second format.

23. The method of claim 20, further comprising:
- providing a first current to a variable reference impedance to generate a first voltage at the variable reference impedance;
- providing a second current at the output port to generate a second voltage at the output port; and
- determining the relationship between the impedance of the external device and the impedance threshold based on a relationship between the first voltage and the second voltage.

24. The method of claim 23, wherein determining the relationship between the impedance of the external device and the impedance threshold comprises:
- adjusting the variable reference impedance until the first voltage is greater than second voltage; and
- determining the impedance of the external device from the variable reference impedance the point that the first voltage exceeds the second voltage.

* * * * *

UNITED STATES PATENT AND TRADEMARK OFFICE
CERTIFICATE OF CORRECTION

| | | |
|---|---|---|
| PATENT NO. | : 7,508,326 B2 | Page 1 of 1 |
| APPLICATION NO. | : 11/643498 | |
| DATED | : March 24, 2009 | |
| INVENTOR(S) | : Daniel Mulligan et al. | |

It is certified that error appears in the above-identified patent and that said Letters Patent is hereby corrected as shown below:

Column 10, Line 14, please change "the impedance" to --the output impedance--

Signed and Sealed this
Twenty-fifth Day of January, 2011

David J. Kappos
*Director of the United States Patent and Trademark Office*